(12) United States Patent
Theroux et al.

(10) Patent No.: US 10,367,878 B2
(45) Date of Patent: Jul. 30, 2019

(54) OPTIMIZATION OF PATH SELECTION FOR TRANSFERS OF FILES

(75) Inventors: Michael Eric Theroux, Greenville, NH (US); Benjamin Patrick Cefalo, Pompano Beach, FL (US); Jeffrey Eugene Piazza, Wellesley, MA (US)

(73) Assignee: BMC Software, Inc., Houston, TX (US)

( * ) Notice: Subject to any disclaimer, the term of this patent is extended or adjusted under 35 U.S.C. 154(b) by 547 days.

(21) Appl. No.: 13/436,887

(22) Filed: Mar. 31, 2012

(65) Prior Publication Data

US 2013/0262660 A1    Oct. 3, 2013

(51) Int. Cl.
*G06F 15/173* (2006.01)
*H04L 29/08* (2006.01)
*H04L 12/707* (2013.01)

(52) U.S. Cl.
CPC .............. *H04L 67/06* (2013.01); *H04L 45/22* (2013.01)

(58) Field of Classification Search
CPC .. G06F 11/2069; G06F 11/1461; G06F 21/64; G06F 17/30221; G06F 21/604; G06F 3/0647; G06F 11/1464; G06F 21/606; G06F 3/067; G06F 17/30; G06F 3/0605; H04L 12/145; H04L 12/14; H04L 67/327; H04L 67/06; H04L 67/1097; H04L 45/22; H04L 67/2852; H04L 45/70
USPC .................................................. 709/224, 217
See application file for complete search history.

(56) References Cited

U.S. PATENT DOCUMENTS

| | | | |
|---|---|---|---|
| 7,275,103 B1 * | 9/2007 | Thrasher | H04L 45/22 709/223 |
| 7,398,302 B2 * | 7/2008 | Yamagami et al. | 709/217 |
| 2002/0138552 A1 * | 9/2002 | DeBruine | H04L 29/06 709/203 |
| 2002/0186701 A1 * | 12/2002 | Kaplan | H04L 12/5692 370/401 |
| 2003/0120685 A1 * | 6/2003 | Duncombe | G06F 21/606 |
| 2003/0167287 A1 * | 9/2003 | Forster | G06F 17/3089 |

(Continued)

OTHER PUBLICATIONS

"Cloud Computing Development", Jan. 14, 2011, 42 pages.

(Continued)

*Primary Examiner* — Vivek Srivastava
*Assistant Examiner* — Muhammad Raza
(74) *Attorney, Agent, or Firm* — Brake Hughes Bellermann LLP (57) ABSTRACT

A system may include a file transfer manager that determines a file for transfer from a source location to a target location, the file being associated with file metadata characterizing the file, and with an organization. The file transfer manager may include an orchestrator that determines at least two transfer paths for the transfer, including at least a first transfer path utilizing a private wide area network (WAN) of the organization and a second transfer path utilizing a publicly available data hosting service, access transfer metadata characterizing the at least two transfer paths, and access organizational metadata characterizing organizational transfer path usage factors. The file transfer manager also may include a heuristics engine configured to execute path decision logic using the file metadata, the transfer metadata, and the organizational metadata, to select a selected transfer path from the at least two transfer paths.

11 Claims, 4 Drawing Sheets

(56) References Cited

U.S. PATENT DOCUMENTS

| | | | |
|---|---|---|---|
| 2004/0128363 A1* | 7/2004 | Yamagami | G06F 11/2069 709/217 |
| 2005/0182821 A1* | 8/2005 | Chan | G06F 21/6236 709/207 |
| 2006/0072543 A1* | 4/2006 | Lloyd | H04L 12/2602 370/351 |
| 2006/0112176 A1* | 5/2006 | Liu | H04L 29/12066 709/245 |
| 2007/0027936 A1* | 2/2007 | Stakutis | G06F 11/1451 |
| 2007/0130290 A1* | 6/2007 | van der Winkel | H04L 12/2856 709/219 |
| 2008/0043736 A1* | 2/2008 | Stanley | H04L 67/06 370/392 |
| 2009/0089315 A1* | 4/2009 | Jeffery | G06F 17/30722 |
| 2009/0319534 A1* | 12/2009 | Gokhale | G06F 17/30 |
| 2011/0022642 A1* | 1/2011 | deMilo | G06F 17/30082 707/805 |
| 2011/0125849 A1* | 5/2011 | Boyd | H04L 63/123 709/204 |
| 2011/0238687 A1* | 9/2011 | Karpuram | G06Q 10/06 707/769 |
| 2012/0101995 A1* | 4/2012 | Agetsuma | G06F 3/0605 707/644 |
| 2012/0150954 A1* | 6/2012 | Tofano | G06F 9/5066 709/204 |
| 2012/0191657 A1* | 7/2012 | Weinstein et al. | 707/654 |
| 2012/0221696 A1* | 8/2012 | Ferris | 709/223 |
| 2012/0284357 A1* | 11/2012 | Meisels et al. | 709/217 |
| 2013/0232553 A1* | 9/2013 | Tomfohrde | G06F 21/10 726/4 |
| 2014/0258441 A1* | 9/2014 | L'Heureux | H04W 12/06 709/217 |

OTHER PUBLICATIONS

"The BitTorrent Protocol", BitTorrent, Jan. 3, 2011, 43 pages.

Lueck, Horst, "Introduction to Cloud Computing on Amazon Web Services (AWS) with Focus on EC2 and S3", retrieved from http://itproforum.org, May 17, 2011, 19 pages.

* cited by examiner

OPTIMIZATION OF PATH SELECTION FOR TRANSFERS OF FILES

TECHNICAL FIELD

This description relates to executing transfers of files.

BACKGROUND

Many businesses and other organizations use private wide area networks (WANs) to execute intra-organizational communications, or to otherwise store and/or exchange data in a secure, reliable manner. For example, businesses may construct a virtual private WAN by overlaying secure (e.g., encrypted) communications on an otherwise public network, such as the public Internet. In additional or alternatively examples, organizations may utilize secure servers to coordinate and otherwise execute network traffic belonging to the organization in question. In still other examples, businesses may construct their own private or proprietary network infrastructure, which may have little or no connection or interaction with public networks.

All such private WANs provide their organizational owners with varying degrees of privacy and control with respect to organizational data. Consequently, in addition to providing organizations with secure, confidential communications, such private WANs may enable varying degrees of control and flexibility in enforcing various organizational policies with respect to how network resources are utilized, and may also be configured to provide a desired level of service quality (e.g., characterized by a guarantee of specified transfer speeds and/or network availability).

However, generally speaking, such advantages are associated with commensurate increases in cost. Consequently, a cost of use of a virtual private network may become undesirably high for an organizational owner. In particular, for example, global companies may require global solutions for the transfer of files between geographically-diverse locations. In such contexts, the use of a private WAN for file transfer may be undesirably expensive, or otherwise infeasible.

SUMMARY

According to one general aspect, a scheduling system for scheduling executions of tasks within a distributed computing system may include instructions stored on a non-transitory computer readable storage medium and executable by at least one processor. The system may include a file transfer manager configured to cause the at least one processor to determine a file for transfer from a source location to a target location, the file being associated with file metadata characterizing the file, and with an organization. The file transfer manager may include an orchestrator configured to determine at least two transfer paths for the transfer, including at least a first transfer path utilizing a private wide area network (WAN) of the organization and a second transfer path utilizing a publicly available data hosting service, access transfer metadata characterizing the at least two transfer paths, and access organizational metadata characterizing organizational transfer path usage factors. The file transfer manager may include a heuristics engine configured to execute path decision logic using the file metadata, the transfer metadata, and the organizational metadata, to thereby select a selected transfer path from the at least two transfer paths.

According to another general aspect, a method may include determining a file for transfer from a source location to a target location, the file being associated with file metadata characterizing the file, and with an organization, and determining at least two transfer paths for the transfer, including at least a first transfer path utilizing a private wide area network (WAN) of the organization and a second transfer path utilizing a publicly available data hosting service. The method may include accessing transfer metadata characterizing the at least two transfer paths, accessing organizational metadata characterizing organizational transfer path usage factors, and executing path decision logic using the file metadata, the transfer metadata, and the organizational metadata, to thereby select a selected transfer path from the at least two transfer paths.

According to another general aspect, a computer program product may include instructions recorded on a non-transitory computer readable storage medium. The instructions may be configured to cause at least one processor to determine a file for transfer from a source location to a target location, the file being associated with file metadata characterizing the file, and with an organization, and determine at least two transfer paths for the transfer, including at least a first transfer path utilizing a private wide area network (WAN) of the organization and a second transfer path utilizing a publicly available data hosting service. The instructions, when executed, may be further configured to access transfer metadata characterizing the at least two transfer paths, access organizational metadata characterizing organizational transfer path usage factors, and execute path decision logic using the file metadata, the transfer metadata, and the organizational metadata, to thereby select a selected transfer path from the at least two transfer paths.

The details of one or more implementations are set forth in the accompanying drawings and the description below. Other features will be apparent from the description and drawings, and from the claims.

DETAILED DESCRIPTION

Figure 1:
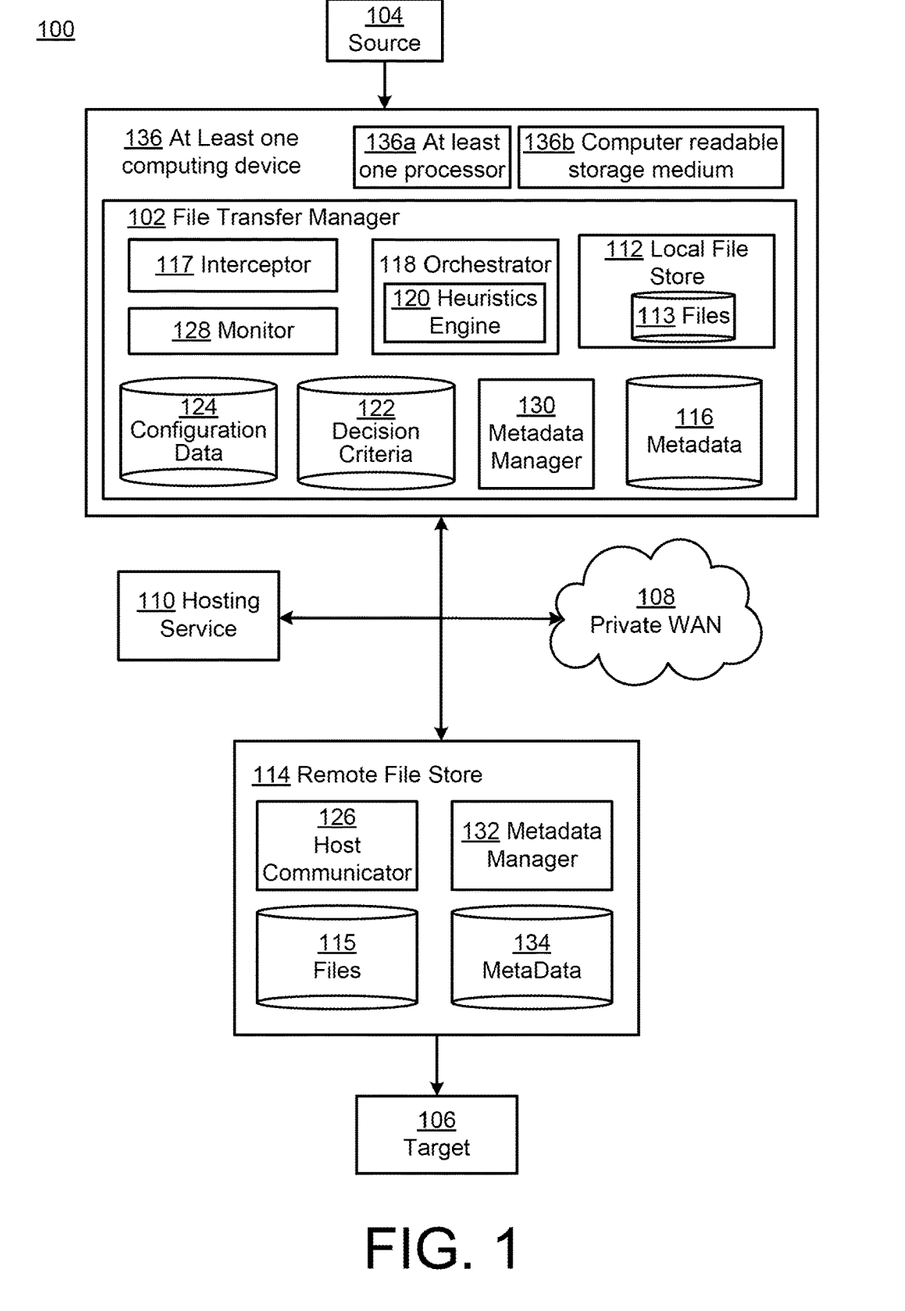
FIG. 1 is a block diagram of a system for optimization of path selection for transfers of files.

FIG. 1 is a block diagram of a system 100 for optimization of path selection for transfers of files. In FIG. 1, a file transfer manager 102 is configured to facilitate transfers of files between a source 104 and a target 106. More particularly, as shown and described, the file transfer manger 102 may be configured to select between at least two available file transfer paths, so as to optimize the transfers of files between the source 104 and the target 106. Specifically, as shown, the available transfer paths may include at least a private WAN 108, as well as a hosting service 110 (which, as described in detail below, may represent more than one available hosting service). By implementing an intelligent selection of file transfer paths, the file transfer manager 102 may ensure that transfers of files occur in a manner that is cost-effective and efficient, and that ensures a judicious and prudent use of the relatively scarce resources of the private WAN 108, without sacrificing desired levels of security, reliability, and/or latency.

In the example of FIG. 1, the system 100 may be understood to be utilized by an organization which owns, leases, or otherwise administers the private WAN 108. In various examples described herein for the sake of illustration, such an organization may be referred to as, or may otherwise represent, a business, company, corporation, enterprise, or other for-profit entity. However, such examples may be understood to be non-limiting, and, in other examples, the organization may be understood to represent an educational institution, a governmental (e.g., military) institution, or any personal or non-profit entity which might be desirous of implementing the private WAN 108 for executing intra-organizational file transfers.

Inasmuch as an organization implementing the system 100 may be understood to have the just-described scope, it may also be appreciated that a type and content of files to be transferred by the file transfer manager 102 may have a similar breadth of scope. For example, such files may include virtually any type of file and associated content, including database files, audio/video files, text files, software applications and associated code, and virtually any other type of digital information which the organization implementing the system 100 may be desirous of transferring from the source 104 to the target 106.

In the context of many of the examples provided below with respect to FIGS. 1-4, the system 100 is described as being implemented by a global business organization requiring a global solution for the transfer of files between diverse geographical locations. In such scenarios, files to be transferred may vary widely in size, and, in some cases, may include individual files which are many gigabytes in size, or larger. In such contexts, in particular, it may not be cost effective, or may otherwise be undesirable or infeasible, to utilize the private WAN 108 for associated file transfers. However, again, it may be appreciated that such example scenarios are provided merely for the sake of illustration, and are not considered to be limiting with respect to potential uses of the system 100.

Thus, in the example of FIG. 1, the private WAN 108 may be understood to represent virtually any proprietary or otherwise use-restricted network that is implemented, maintained, or otherwise utilized by an organization implementing the system 100. Various features, functions, and characteristics of such private WANs, by themselves, are generally well known, and are therefore not described here in detail, except as may be necessary or helpful in understanding operations of the system 100.

In general, however, it may be appreciated that the private WAN 108, as referenced herein, may be implemented as a virtual private network, and which various security protocols and other transmissions techniques are utilized in order to execute private, secure data transfers using an otherwise public network (e.g., the public Internet, not specifically illustrated in the example of FIG. 1). As also known and described herein, the private WAN 108 also may include varying levels of proprietary hardware and/or network infrastructure (e.g., private application servers, firewalls, and/or network traffic management hardware/software).

Meanwhile, the hosting service 110 may represent virtually any publicly-available (e.g., including commercial or non-commercial) service(s) which is designed, marketed, and/or provided for remote storage of data. For example, in many cases, a person or an organization, such as the organization implementing the system 100 of FIG. 1, may posses a relatively large quantity of data to be stored in permanent storage. In many cases, a quantity of the data to be stored in permanent storage may be sufficiently large that it becomes undesirable, impractical, or infeasible for the owner of the data to purchase, posses, or maintain an associated quantity of permanent storage which is necessary for storing the data in question. For example, it may be prohibitively expensive to purchase the necessary quantity of permanent storage and associated computing resources. In additional or alternative examples, the owner of the data may not wish to have responsibility for maintaining the security of the data, or the safety of the data in case of a memory or other hardware/software failure.

In other scenarios, data storage requirements of a person or organization may vary widely and/or unpredictably over time. In such scenarios, again, it may be undesirable or infeasible for the owner of the data to purchase a sufficiently large quantity of permanent storage and associated resources to store a maximum-required quantity of data, since, in many cases (i.e., when data storage requirements are relatively low) an unacceptably large proportion of the data storage resources would go unused.

In order to address these and related concerns, data hosting services and related infrastructures, represented by the hosting service 110 in the example of FIG. 1, have been developed and deployed for the purpose of providing remote data storage. For example, a provider of the hosting service 110 may invest in all necessary hardware/software infrastructure, including, e.g., large quantities of permanent storage, as well as distributed data centers (not specifically illustrated in the example of FIG. 1), which may be distributed across a wide geographical area, for the purpose of reducing response latencies with respect to requests for data from consumers who are also distributed through the geographical region, as well as for the purpose of providing data redundancy (and thus providing loss protection). Additionally, the hosting service 110 may provide whatever features and functions are necessary for enabling consumers to remotely connect with the hosting service 110, and to upload, download, store, maintain, or otherwise access data using the resources of the hosting service 110.

Thus, the hosting service 110 may be understood to represent, without limitation, virtually any publicly-available service for receiving, storing, and accessing data over a connected network. In the particular examples described below, the hosting service 110 may be described as being available over the public Internet, in conjunction with individual user accounts, which themselves may be associated with varying levels of provided services. For example, consumers of the hosting service 110 may elect to receive varying quantities of available data storage, security requirements, latency requirements, or virtually any other aspect or characteristic of desired services. In general, it may be appreciated that such varying service levels will correspond with varying cost requirements. Nonetheless, in general, in the example of FIG. 1, it is assumed that such costs are generally proportionally smaller than corresponding costs associated with maintenance and use of the private WAN 108.

In specific examples described with respect to FIG. 1, as referenced above, it is assumed that the organization implementing the system 100 is concerned with administering a widely-distributed collection of data centers and other data storage locations. For example, the organization may represent a business which administers a number of distributed data centers, as well as a larger number of corporate sites at which various employees are stationed. Thus, in the example of FIG. 1, the source 104 may represent an employee location and associated computing resources being utilized by an employee, while the file transfer manager 102 is implemented at a relatively nearby data center.

Through the use of such distributed data centers, therefore, the source 104 may have relatively low-latency access to a local file store 112. In this way, a large number of files 113 may be stored using a local file store 112, while maintaining relatively fast and inexpensive access thereto by the source 104. In other words, in various example embodiments, the source 104 may have a range of abilities of storing files itself, yet, in any case, may benefit from low latency access to the permanent storage resources of the local file store 112.

Further in the example of FIG. 1, the target 106 may be understood to be similarly situated. That is, the target 106 may be understood to represent, for example, a second employee location, which is itself relatively close to (or otherwise in low-latency communications with) a remote file store 114. Consequently, it may be appreciated that the target 106 has a similar relationship with, and obtains similar benefits from the use of, the remote file store 114, as already described above with respect to the source 104 and the local file store 112 (including use of, and low-latency access to, stored files 115).

Thus, it may be appreciated that the file stores 112, 114 may represent, or be associated with, two distributed data centers of a larger number of geographically-distributed data centers, each of which may be associated with one or more locations which are associated therewith. In this regard, it may be appreciated that the file stores 112, 114 are referred to herein as local and remote file stores, respectively, but that such terminology is used merely for the sake of clarity of reference to the example of FIG. 1, and that such naming of the file stores 112, 114 depend entirely on a perspective of a current use/user of the system 100.

Thus, in the examples of FIG. 1, the file transfer manager 102 may be observed to facilitate and implement file transfers from the source 104 to the target 106, by way of intervening file stores 112, 114. More specifically, as described in detail below, the file transfer manager 102 may be configured to decide between the private WAN 108 and the hosting service 110 as alternative transfer paths for use in executing the desired file transfer. The file transfer manager 102 may decide which transfer path to utilize, based on various factors related to, e.g., the file to be transferred, organizational requirements of the organization, and/or varying characteristics of the transfer paths 108, 110 themselves.

In this way, for example, the file transfer manager 102 may avoid the needless use of the scarce resources of the private WAN 108 in transferring files which do not require one or more features/advantages provided by the private WAN 108, while, at the same time, ensuring that files transferred using the hosting service 110 are not transmitted in a way that violates requirements (e.g., security or latency requirements) of the organization implementing the system 100 of FIG. 1. In so doing, the file transfer manager 102 may utilize various types of metadata 116, which, as just referenced, may be utilized to characterize, e.g., the files 113, the transfer paths 108/110, and/or various aspects related to the organization implementing the system 100.

Then, in the example of FIG. 1, an interceptor 117 may be utilized to detect file transfer requests associated with the source 104. For example, the interceptor 117 may determine a request to transfer a file located at the source 104 to the target 106, or may determine a request to transfer one of the files 113 already stored using the local file store 112 to the remote file store 114 and/or the target 106.

In the example of FIG. 1, the interceptor 117 is illustrated as a component of the file transfer manager 102, and separately from the source 104. For example, the interceptor 117 may be implemented at a server that is remote from the source 104, and accessible in the context of a webpage and/or web service that is exposed to, and accessed by, the source 104 using an otherwise conventional browser application.

However, in other example implementations, the interceptor 117 may be implemented at the source 104. For example, the interceptor 117 may be implemented as a proxy or application program interface (API) that intercepts operating system file input/output calls issued at the source 104. For example, an employee utilizing a computer associated with the source 104 may select a copy operation with respect to a particular file to be transferred, which would normally be detected by an associated operating system. In the example, the interceptor 117 would intercept such a request associated with the operating system, so as to thereby initiate the transfer of the associated file using the system 100. This style of interception may also be implemented at the location of the employee issuing the request to copy a file from a source to target. In this case, the employee is on host B, issuing a command to copy information from Host A to Host C. The proxy can intercept the operating system file input/output calls issued at that location.

Specifically, as shown, in the example of FIG. 1, the interceptor 117 may notify an orchestrator 118, which, as described herein, may be configured to facilitate and otherwise coordinate interactions between the file stores 112, 114 utilizing the private WAN 108 and/or the hosting service 110. In particular, as shown and described, the orchestrator 118 may include a heuristics engine 120 which may be configured to analyze an appropriate subset of the metadata 116 in conjunction with a requested file transfer, so as to thereby implement associated decision criteria 122 for selecting between the private WAN 108 and the hosting service 110 as available transfer paths for transferring the file in question. Advantageously, as may be appreciated from the following description, the decision criteria 122 may be highly configurable with respect to specific needs and desires of the organization implementing the system 100. For example, the decision criteria 122 may be configured to consider certain types or aspects of the metadata 116 in order to select between the private WAN 108 and the hosting service 110, while ensuring that the resulting transfer complies with organizational requirements of the organization in question.

By way of non-limiting example, as referenced above, the metadata 116 may include file metadata that is associated with, and characterizes, the individual file or files to be transferred. For example, such file metadata may include a size of the file, characterizations of content of the file, a security level required to be associated with the file, information relating the file to other files (e.g., as part of a service-oriented architecture), latency requirements associated with a transfer of a file, ownership of the file, including, e.g., a title, role, or other characteristic of the file owner, and virtually any other feature or characteristic which may be associated with the file to be transferred, and which may be useful to the heuristics engine 120 in implementing (a relevant subset of) the decision criteria 122.

The metadata 116 also may include transfer metadata related to, e.g., characterizing, one or both of the transfer paths associated with the private WAN 108 and the hosting service 110. For example, such transfer metadata may include static or relatively static characteristics or features of the available transfer paths, such as relevant security protocols/techniques utilized, cost per gigabyte of transferred data, service level guarantees, and virtually any other information describing availability, implementation, or utilization of the available transfer paths. Additionally, the transfer metadata may include dynamic characteristics of one or both of the private WAN 108 and the hosting service 110, as may exist at or about a time of a desired file transfer. For example, such dynamic characteristics may include current latency times experienced by a given amount of data on each of the available transfer paths, any current failures or other malfunctions currently being experienced by one or more nodes along each transfer path, available network bandwidth, and virtually any other network characteristic which may change as a function of time (or time-related parameters).

Additionally, or alternatively, some transfer metadata may be considered to be static in some scenarios, and dynamic in others. Further, a nature of the transfer metadata may vary with respect to whether the transfer metadata is characterizing the private WAN 108 or the hosting service 110. For example, in some scenarios, the transfer metadata may characterize an amount of available data storage provided by the hosting service 110 (e.g., for a given price point). In some scenarios, this quantity may be relatively fixed in time with respect to a usage thereof by the organization implementing the system 100 of FIG. 1. In other example implementations, however, a current availability of data storage provided to the organization by the hosting service 110 may vary in time and/or based on various related factors (so as to thereby dynamically meet changing data storage requirements of the organization or other users).

Thus, it may generally be appreciated that the transfer metadata may include virtually any information characterizing available or potential transfer paths, including the private WAN 108 and the hosting service 110. In so doing, the transfer metadata may characterize the private WAN 108 and the hosting service 110 in absolute terms, and/or in relative terms with respect to one another and/or some relevant benchmark(s). Thus, as just referenced, some transfer metadata may relate to only one or a subset of available transfer paths (e.g., may apply only to the private WAN 108, or only to the hosting service 110), or may apply to all available transfer paths.

Still further, the metadata 116 may include organizational metadata characterizing aspects of the organization implementing the system 100 of FIG. 1. In particular, such organizational metadata may relate to, e.g., may characterize, any requirement or desire of the organization which may be relevant to determining whether and how to transfer a particular file from the source 104 to the target 106. Organizational metadata may include, for example, desired security levels, quality of service levels, latency guarantees, time of day, and any other information characterizing a manner in which the organization may wish files to be transferred.

In particular examples, the organizational metadata may relate to individual members of the organization (e.g., may relate to employees of a business). For example, the organizational metadata may relate particular roles or other characteristics of users with corresponding priority levels to be provided to the users in the context of file transfers using the system 100 of FIG. 1. In additional or alternative examples, the organizational metadata may include various constraints on file transfers, e.g., may prohibit file transfers of a certain size during certain time periods (e.g., during peak business hours), or any other organizational metric which may be related to a manner in which file transfers are conducted.

In the examples described above, the metadata 116 is described as potentially varying in time, or otherwise including dynamic metadata (e.g., metadata which includes dynamically/changing values). As also referenced, such dynamic metadata may be useful or necessary in the context of a path selection to be executed by the orchestrator 118 based on the decision criteria 122.

Consequently, as shown, a monitor 128 may be configured to observe the private WAN 108 and the hosting service 110, and to otherwise monitor and collect relevant and/or current values of dynamic metadata of the metadata 116. Consequently, the orchestrator 118 may utilize such collected values from the metadata 116 to perform selections between available transfer paths.

In addition to maintaining and updating current values of subsets of the metadata 116, the monitor 128 may also be utilized to facilitate operations of the heuristics engine 120 with respect to the decision criteria 122. For example, as referenced above, the monitor 128 may observe results of file transfers executed by the orchestrator 118. In this way, the monitor 128 may assist the file transfer manager 102 in judging a relative success of the file transfer path selection process. For example, in this way, the file transfer manager 102 may determine that a particular transfer path selection was made in error, e.g., was made based on a presumption of a maximum latency, but that the desired goal or objective was not met, so that the heuristics engine 120 may update the decision criteria 122 accordingly.

In practice, the metadata 116 may be obtained from a variety of sources, and in a variety of manners. For example, the metadata 116 may be populated partially or completely through interactions with administrators or other users of the system 100. In additional or alternative examples, metadata may automatically be generated and updated with respect to files to be transferred, transfer paths to be utilized, and organizations administering the system 100. For example, upon entry of new types of metadata 116 and/or associated values thereof, or upon receipt of new files, a metadata manager 130 may be utilized to automatically create or supplement available metadata.

For example, upon receipt of a new file of the files 113, the metadata manager 130 may analyze the content and other characteristics of the new file, and may automatically generate new/additional file metadata associated therewith. Somewhat similarly, the metadata manager 130 may interact with the monitor 128 to determine current conditions related to available transfer paths. For example, the network monitor 128 or other components of the file transfer manager 102 may notify the metadata manager 130 that a new hosting service has become available, in which case the metadata manager 130 may again generate or otherwise determine various transfer of metadata and related values associated therewith.

Additional or alternative features and functions of the metadata manager 132 may include updating the metadata 116 in conjunction with, or in response to, a successful or unsuccessful completion of a desired file transfer, as described in more detail below with respect to FIGS. 3, 4. For example, the file metadata of the metadata 116 may include information characterizing current location (or other state or historical information) of a particular file. Consequently, upon transfer of such a file, the associated metadata may be updated by the metadata manager 130 to reflect the changed state/status of the file in question. Moreover, to the extent that such file transfers affect contents of both the local file store 112 (i.e., files 113), as well as the remote file store 114 (i.e., the files 115), the remote file store 114 may also include a metadata manager 132 which is configured to update metadata 134 with respect to the files 115 at the remote file store 114.

Thus, the decision criteria 122 may be understood to represent any rules, algorithms, or other processes for utilizing some or all of the available, relevant metadata 116 to thereby select between available transfer paths for transfer of a file in question. For example, the decision criteria 122 may specify particular types or other subsets of the metadata 116 to be used in conjunction with a particular file and transfer path selection. Additionally, or alternatively, the decision criteria 122 may specify a relative weight or importance of each type of metadata, and associated values thereof, in selecting between available transfer paths. In still other examples, the decision criteria 122 may implement various types of known machine-learning algorithms designed to measure and test executed file transfers using various types of files and various transfer paths, and to infer therefrom optimal selection techniques for obtaining desired outcomes with respect to file transfers, which may then be utilized to predict subsets of the metadata 116 that are thought to be most useful in obtaining a desired outcome with respect to requested file transfers.

In any of the just-described examples, it may be appreciated that an operator or other administrator of the system 100 may specify various aspects of the decision criteria 122, e.g., using an appropriate user interface. For example, the administrator may specify which subsets of the metadata 116 are to be used, and/or may specify desired algorithms, results, or other parameters that may be included in the decision criteria 122, for use by the heuristics engine 120 in selecting between available transfer paths for executing a given file transfer.

Upon selection of one or more transfer paths by the orchestrator 118, a corresponding transfer of the file in question may proceed. In this regard, it may be appreciated that in circumstances in which the private WAN 108 is selected as the transfer path to be used, a resulting file transfer may proceed in a normal manner with respect to a relevant implementation of the private WAN 108, except as otherwise described herein. That is, it may be appreciated that conventional, current implementations of private WANs, such as the private WAN 108, often contemplate file transfers within and among distributed data centers, so that the orchestrator 118 may utilize such functionality to execute file transfers in the context of the system 100. Nonetheless, in utilizing the private WAN 108 for file transfers, the file transfer manager 102 may also utilize many additional or alternative operations, in conjunction with the conventional transfer operations just referenced. For example, such additional operations may be undertaken with respect to updating or otherwise maintaining the metadata 116 in association with the file transfers executed using the private WAN 108, as described in more detail below.

Meanwhile, with respect to example embodiments in which the hosting service 110 is selected as part of a file transfer path, it may be appreciated that certain information may be required in order to access the hosting service 110. In the example of FIG. 1, such information is represented by configuration data 124. For example, such configuration data 124 may include a username/password pair which may be associated with the organization, or a member thereof, for use in accessing a registered account provided by the hosting service 110 in conjunction with data storage resources being provided. Of course, in other example embodiments, the hosting service 110 may require additional or alternative registration/access information, such as, for example, relevant digital certificates, question/answer pairs, or various other authentication criteria/techniques which may be required to access organizational data stored using the hosting service 110.

Therefore, in order to access files stored using the hosting service 110 in the context of the file transfer conducted by the system 100, the orchestrator 118, upon selection of the hosting service 110 for inclusion in a selected transfer path, may transfer relevant portions of the configuration data 124 to the remote file store 114 which is designated as receiving the transfer file.

More specifically, as shown, the remote file store 114 may include a host communicator 126 which is configured to receive relevant portions of the configuration data 124, so as to thereby directly access the hosting service 110 and retrieve the file that is to be transferred. Thus, it may be appreciated that the orchestrator 118 may utilize the configuration data 124 in utilizing the hosting service 110 in the context of a file transfer path. Specifically, as described, the orchestrator 118 may execute file transfers by uploading the relevant file to the hosting service 110, while also transmitting or otherwise providing the relevant portions of the configuration data 124 to the host communicator 126, so that the remote file store 114 may thereafter retrieve the stored file, and thereby complete the file transfer process.

In the example of FIG. 1, the file transfer manager 102 is illustrated as being executed using at least one computing device 136, which may include at least one processor 136*a* and associated computer readable storage medium 136*b*. More specifically, as may be appreciated, instructions recorded using the computer readable storage medium 136*b* may be executed using the at least one processor 136*a*, to thereby transform the at least one computing device 136 into a specialized computing device which includes the features and functions of the file transfer manager 102 as described herein.

As referenced above, the system 100 may be understood to represent a distributed system which includes a relatively large number of distributed data centers. Consequently, it may be appreciated that some or all of the file transfer manager 102 may be implemented at any of the distributed data centers included within the system 100. Thus, to the extent that the example of FIG. 1 illustrates a simplified version of the system 100, and the various components of the system 100 may similarly be understood to represent specific, simplified examples of components which may be utilized to provide the various features and functions associated with the file transfer manager 102 and described herein.

For example, as referenced above, it may be appreciated that the various components of the system 100 are illustrated in the context of discrete modules. Nonetheless, it may be appreciated that any two of the various components of the system 100 may be implemented as single, combined component. Conversely, any single component may be implemented using two or more subcomponents to provide the same or similar outcome.

Still further, components illustrated in one context in the example of FIG. 1 may be implemented in different context and different examples. For example, as referenced above, the interceptor 117 is illustrated as being implemented using the at least one computing device 136, but, in practice, the interceptor 117, or portions thereof, may be implemented using the source 104 as a separate computing platform. Many other example implementations and associated features are described below with respect to FIGS. 2-4.

Figure 2:
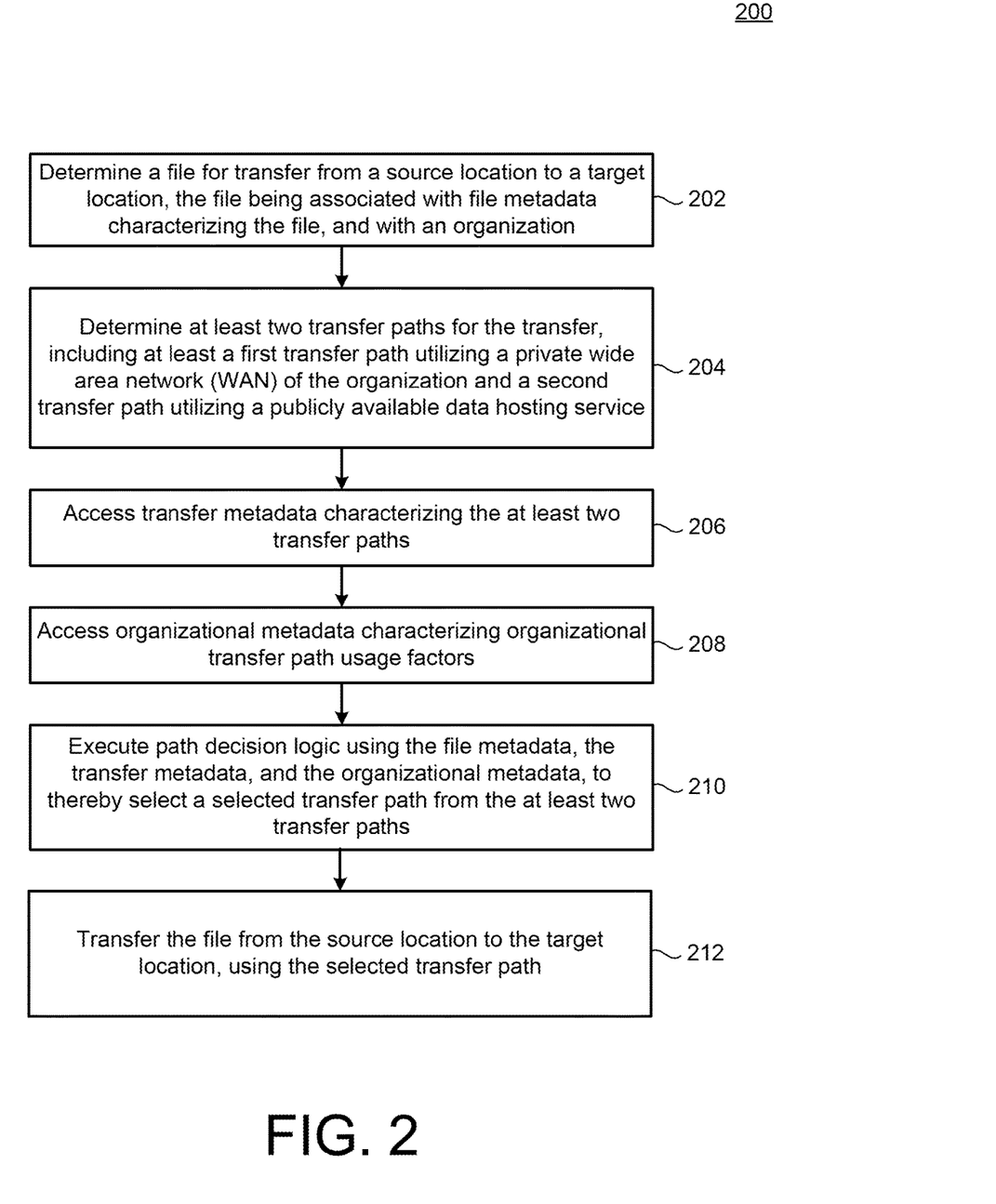
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated as separate, sequential operations. However, it may be appreciated that the operations 202-212 may be performed in a different order than that shown, e.g., in a nested, iterative, or looped fashion. Further, the operations 202-212 may be performed in a partially or completely overlapping or parallel manner. Further, additional or alternative operations may be included, and one or more of the operations 202-212, or portions thereof, may be omitted in some example embodiments.

In the example of FIG. 2, a file may be determined for transfer from a source location to a target location, the file being associated with file metadata characterizing the file, and with an organization (202). For example, the file transfer manager 102 may be configured to copy or otherwise transfer a file from the source location 104 to the target location 106 of FIG. 1. In this regard, it may be understood that the source and target locations also may include, or be represented by, the local file store 112 and/or the remote file store 114.

Nonetheless, in specific examples, the source location and associated source computer 104 of FIG. 1 may represent a starting point for transfer of a file therefrom to the target computer 106, as designated by the user (e.g., during a copy operation). As described above with respect to FIG. 1, such a file may be associated with the file metadata stored within the metadata 116, and may be on, or otherwise associated with, an organization implementing the system 100. In various examples, as described, the file to be transferred may originally be stored at the source location 104, and may thereafter be transferred to the local file store 112. In other examples, even if the transfer is initiated at the source location 104, the file to be transferred already may be present within the files 113 of the local file store 112.

As described, in specific examples, the interceptor 117 may be configured to determine the file for transfer by intercepting file input/output operations occurring at the source 104. As may be appreciated by one of skill in the art, the interceptor 117 may be implemented using standard C-language interfaces, or the use of Aspects in Java. Thus, the interceptor 117 may be configured to intercept any calls to store, remove, copy, or otherwise utilize the file, both locally and across one or more relevant networks.

At least two transfer paths may be determined for the transfer, including at least the first transfer path utilizing a private wide area network (WAN) of the organization (e.g., the private WAN 108), and the second transfer path utilizing a publicly-available data hosting service (e.g., the hosting service 110) (204). For example, the orchestrator 118 may determine the existence, availability, and/or potential use of the private WAN 108 and the hosting service 110 in transferring the file in question.

In the simplified example of FIG. 1, only the single private WAN 108 and the single hosting service 110 are illustrated. However, it will be appreciated that the system 100 may potentially utilize three or more potential transfer paths. For example, multiple private WANs (or portions thereof) may be available for the transfer, and/or a plurality of hosting services also may be considered among the potential transfer paths.

In practice, the orchestrator 118 may be configured to ensure that the file in question exists within, or is copied to, the local file store 112, in conjunction with a desired or specified amount of file metadata. For example, if necessary, the orchestrator 118 may utilize the metadata manager 130 to generate any additional, required metadata, or may prompt a user to enter desired types/values of relevant file metadata.

Transfer metadata characterizing the at least two transfer paths may be accessed (206). For example, the orchestrator 118 may access transfer metadata characterizing the private WAN 108 and the hosting service 110 from within the metadata 116. As referenced above, such transfer metadata may include generally static or infrequently-changing characteristics of the transfer paths 108, 110, or, in other examples, may include transfer metadata which changes dynamically, and potentially rapidly. In the latter case, the monitor 128 may be utilized by the orchestrator 118 to determine or report on current conditions which exist with respect to the private WAN 108 and/or the hosting service 110, and which may be relevant for inclusion within the transfer metadata.

Similarly, organizational metadata characterizing organizational transfer path usage factors may be accessed (208). For example, the orchestrator 118 may access organizational metadata from within the metadata 116, and/or may request such organizational metadata from the metadata manager 130 and/or from one or more relevant, external members of the organization (e.g., the user of the source computer 104, and/or administrator of the system 100).

As described herein, such transfer path usage factors may relate to any constraint, requirement, or other specification or rule of the organization which may potentially impact the transfer path selection between the private WAN 108 and the hosting service 110. Such organizational metadata may be provided with respect to particular users, classes of users, or to the organization as a whole (or specified portions thereof). For example, the organizational metadata may specify relative priority levels assigned to individual users or classes of users, security requirements associated with particular files or types of files, times of day that a given transfer path should be preferred or non-preferred, or any other relevant usage factor.

Path decision logic may then be executed using the file metadata, the transfer metadata, and the organizational metadata, to thereby select a selected transfer path from the at least two transfer paths (210). For example, the heuristics engine 120 may be configured to consult the decision criteria 122 in conjunction with the obtained file metadata, transfer metadata, and organizational metadata, to thereby select either the private WAN 108 or the hosting service 110, or combinations thereof, as the selected transfer path.

As described, the heuristics engine 120 may be configured to consult the decision criteria 122 to execute path decision logic including, e.g., selecting relevant/specified subsets of the various types of metadata 116, and then combining the selected subset of metadata in a specified fashion. For example, in some instances of file transfers, security-related metadata may be considered more important (and may thus be provided greater weight) than latency requirements. Of course, in other example scenarios, such requirements may be reversed, and/or may be overridden by other factors included in the relevant subset of metadata (e.g., a relative priority level(s) of the user and/or the file in question).

Finally in the example of FIG. 2, the file may be transferred from the source location to the target location, using the selected transfer path (212). For example, the file transfer manager 102 may be configured to transfer the file in question to the target location 106, using either the private WAN 108, the hosting service 110, or combinations thereof.

As referenced herein, in the examples described, the source location may be understood to be represented by either the source computer 104 of FIG. 1, and/or the local file store 112, while, similarly, the target location may be understood to represent either by the target computer 106 of FIG. 1, and/or the remote file store 114. As also described, actual execution of the file transfer using the private WAN 108 may proceed in a substantially conventional fashion with respect to a use of conventional private WANs, except as described herein (e.g., with respect to the various metadata-related operations executed in conjunction with the file transfer, and described below with respect to FIGS. 3, 4).

When using the hosting service 110 as part of the selected transfer path, the file transfer manager 102 may be configured to utilize the configuration data 124 to upload or otherwise provide the relevant file to the hosting service 110, and may, in conjunction therewith, provide relevant portions of the configuration data 124 to the remote file store 114, e.g., to the host communicator 126. In this way, as described, the host communicator 126 may complete the transfer of the file by way of the hosting service 110, by utilizing the received configuration data 124 to access the hosting service 110 and the file in question. In this way, the remote file store 114 may be configured to obtain the transfer file, for storage within the files 115 and/or for providing thereof to the target location 106.

Figure 3:
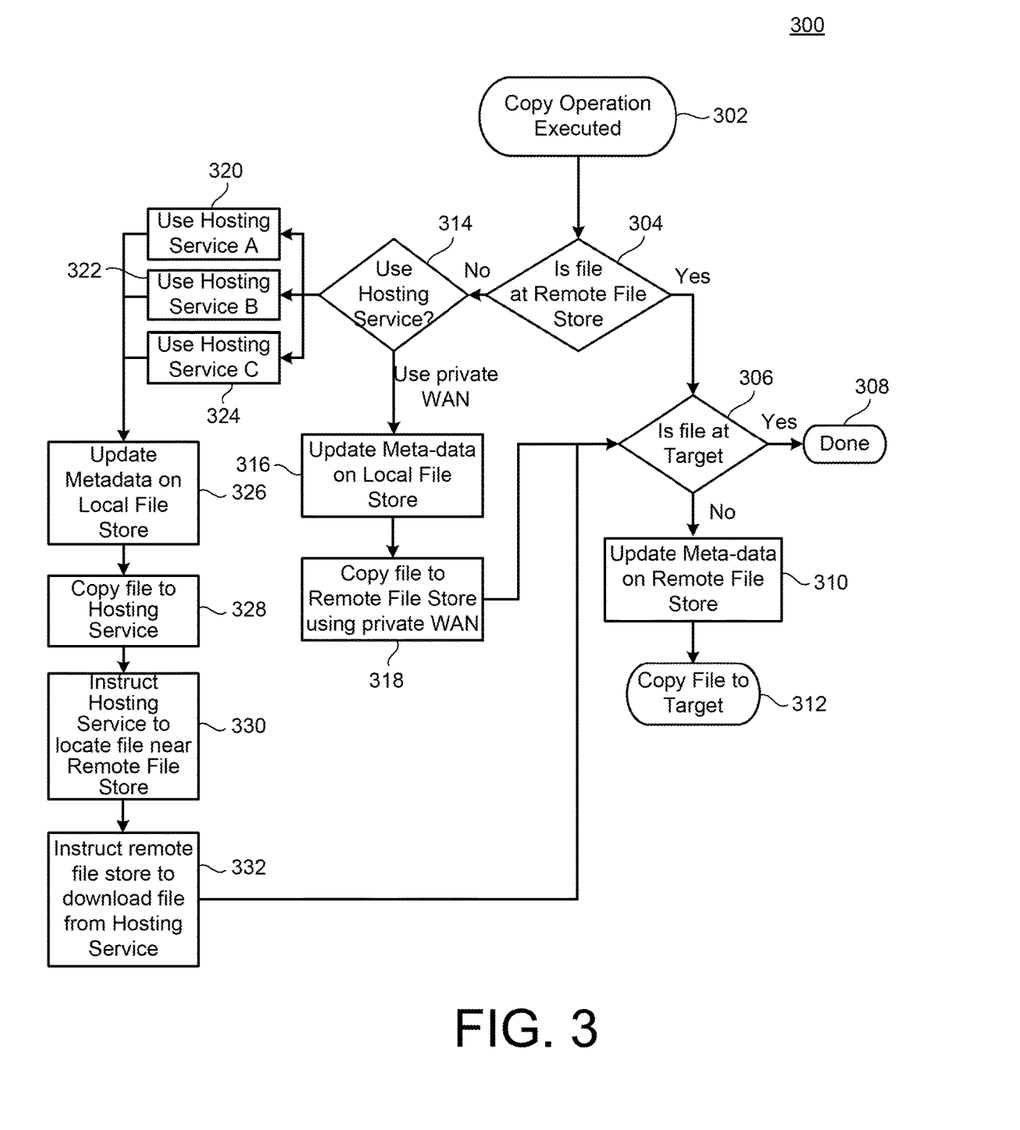
FIG. 3 is a flowchart illustrating more detailed example operations of the system of FIG. 1, in which a file is transferred from a local to a remote location.

FIG. 3 is a flowchart 300 illustrating more detailed example operations of the system 100 of FIG. 1. In particular, as shown and described, the flowchart 300 illustrates an example file transfer operation in which the file in question is transferred from the local file store 112 to the target 106.

Specifically, as shown, a copy operation may be executed (302) with respect to the file in question at the source location 104, where, as described above, such a copy operation may be intercepted by the interceptor 117. Following the copy request, the file transfer manager 102 may initially determine whether the file in question already exists at the remote file store 114 (304). If so, then there may be no need to transfer the file to the remote file store 114. Instead, as shown, the file transfer manager 102 may additionally determine whether the file already exist at the target location 106 (306). If so, then operations of the flowchart 300 may complete (308).

In order to determine whether the file in question exists at the remote file store 114 or the target 106, the file transfer manager 102 may consult the metadata manager 130, or may otherwise utilize available metadata 116/134 to compare content or other characteristics of the file to be transferred with files which are already present (e.g., files 115 at the remote file store 114). For example, the file metadata within the metadata 116/134 may include checksum values for corresponding files, and the file transfer manager 102 may be configured to compare checks and values to determine correspondence of a file already existing at files 115 with a file to be transferred.

More generally, it may occur that file metadata includes metadata characterizing a transfer and/or storage/access history of a corresponding file, and/or a current state of the corresponding file. For example, file metadata related to a file in question may specify a number of times that a file has been transferred, and may identify the various locations at which the file was stored, accessed, transferred, or otherwise updated.

Therefore, in a scenario in which the file in question does not already exist at the target location 106 (306), then the file transfer manager 102 may update the metadata 134 at the remote file store 114, and may thereafter request or otherwise initiate copying of the file in question to the target location 106 (312). In this way, the copy operation may be completed.

If, however, the file in question is not currently present at the remote file store 114 (304), then the orchestrator 118 may utilize the heuristics engine 120 to determine whether to utilize an available hosting service, or to utilize the private WAN 108. The various techniques and factors associated with executing the decision of which transfer path to select (314) are described above, in detail.

In the event that the result of such operations is to utilize the private WAN 108 as the selected transfer path, then the metadata manager 130 of the file transfer manager 102 may proceed to update metadata associated with the file in question and stored using the metadata 116 in conjunction with the local file store 112 (316). That is, it may be appreciated that the reasons and rationale for executing such updates of relevant metadata may be the same or similar as those described above with respect to updating the metadata 134 at the remote file store 114.

Thereupon, the orchestrator 118 may proceed to copy the file in question from the files 113 of the local file store 112 to the files 115 of the remote file store 114, using the private WAN 108 (318). Thereafter, it may be appreciated that the file in question exists at the remote file store 114, so that remaining operations 306-312 may proceed as described above.

On the other hand, if the decision is made to utilize a hosting service as the selected transfer path (314), then the heuristics engine 120 may continue to utilize available metadata and relevant decision criteria 122 to select between a plurality of available hosting services, illustrated in the example of FIG. 3 as hosting services A, B, C (320, 322, 324, respectively). In this way, for example, an optimal hosting service may be selected as the selected transfer path, e.g., based on current conditions existing at each of the available hosting services.

Thereafter, the metadata 116 associated with the file in question at the local file store 112 may be updated (326), as described above. The orchestrator 118 may the proceed to utilize the configuration data 124 to upload or otherwise provide the file in question to the selected hosting service (328).

In so doing, the orchestrator 118 may instruct the selected hosting service to locate the file in question to a physical/geographical location that is relatively close to the remote file store 114. That is, as described above, the various hosting services may themselves deploy one or more private WANs, of varying extent and having varying characteristics. For example, the selected hosting service may deploy a widely distributed system of data centers for storing data, so that it becomes possible to select one of these distributed data centers on the basis of its proximity to the remote file store 114.

The orchestrator 118 may then instruct the remote file store 114 to download the file in question from the selected hosting service (332). For example, the orchestrator may provide necessary portions of a configuration data 124, in conjunction with an identification of the relevant hosting service that has been used. Thereafter, operations 306-312 may proceed as described above, until completion of the copy operation has occurred.

Figure 4:
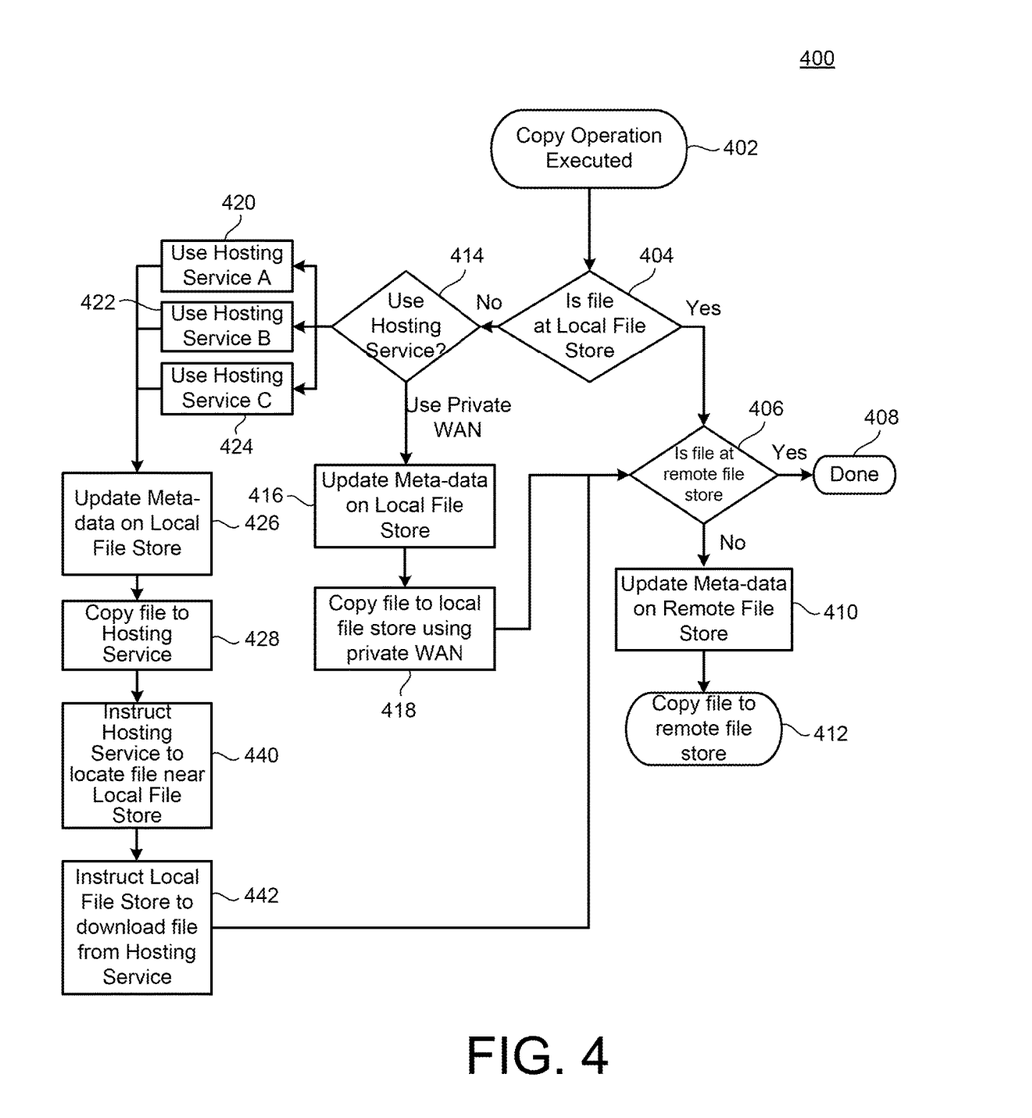
FIG. 4 is a more detailed example implementation of the system of FIG. 1, in which an inverse of the operations of FIG. 3 is implemented to transfer a file from a remote location to a local location.

FIG. 4 is a flowchart 400 illustrating inverse operations of the flowchart 300 of FIG. 3. That is, the flowchart 400 illustrates example scenarios in which a file is transferred from the remote file store 114 to the local file store 112, and/or from the target location 106 to the source location 104. In this regard, of course, it may be appreciated that the terminology used above with respect to description of the source/target locations 104, 106 and the local/remote file stores 112, 114 may be considered to be reversed, purely as a matter of terminology, from the above example scenarios.

Nonetheless, as shown in FIG. 4, identical terminology is used therein for the sake of consistency. Moreover, it is clear from the examples of FIGS. 3 and 4 that FIG. 3 represents a transfer of the file from a location that is local to the copy request to a location that is remote from the copy request (i.e., constitutes a "push" operation), whereas the example of FIG. 4 illustrates scenarios in which a file which is located remotely from the copy operation is transferred therefrom to the location of the copy transfer request (i.e., constitutes a "pull" operation).

Thus, the copy operation requested in FIG. 4 (402), initiates a determination of whether the file in question is already located at the local file store 112, i.e., within the files 113 (404). If so, then a determination may be made as to whether the file in question also exists at the remote file store (406). If so, then the copy operation may complete (408).

More specifically, it may be appreciated from the above description that it is necessary or desirable to ensure that the file exists at both the local file store 112 and the remote file store 114 in the same condition, i.e., associated with the same file metadata, where the file metadata is updated and reflects a current state and past history of the file in question. Therefore, if the file does not exist identically within the files 115 of the remote file store 114 (406), then the file transfer manager 102 may instruct the remote file store 114 to update the metadata 134 accordingly (410), and then proceed with copying the file and associated updated metadata to the remote file store 114 (412).

If the file to be transferred is not present at the local file store (404), then the heuristics engine 120 may proceed with selecting a selected transfer path as described herein, including a determination of whether to use a hosting service of available hosting services (420, 422, 424), or to use the private WAN 108. In the latter case, the metadata manager 130 may be configured to update the metadata 116 to reflect use of the private WAN 108 to transfer the file in question (416), so that copying of the files from the remote file store 114 to the local file store 112, using the private WAN 108, may proceed (418). Thereafter, operations 406-412 may proceed as described above.

On the other hand, if the decision is made to utilize a selected one of available hosting services (420, 422, 424), then, again, a metadata manager 130 may proceed with updating relevant portions of the file metadata stored using metadata 116 at the local file store 112 (426). The file transfer manager 102 may then instruct the remote file store 114 to copy the file in question to the selected hosting service, e.g., the hosting service 110 (428). As may be appreciated, such instruction may include provision of relevant portions of the configuration data 124 to the host communicator 126, so that the remote file store 114 will have an appropriate level of access to the selected hosting service.

As referenced above, the hosting service 110 may be instructed to locate the file in question at a geographical location which is proximate to the local file store 112 (430). Thereafter, the file transfer manager may instruct the local file store 112, using the relevant portions of the configuration data 124, to download the file in question from the hosting service 110 that has been selected as the selected file transfer path (432). Thereafter, as above, operations 406-412 may proceed as described.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system for network path selection for transfers of files within a computing network, including instructions stored on a non-transitory computer readable storage medium and executable by at least one processor, the system comprising:
    a file transfer manager implemented at a first data center, wherein the file transfer manager is configured to cause the at least one processor to transfer a file from a source computing device to a target computing device, the source computing device being communicatively coupled to the first data center, the target computing device being communicatively coupled to a second data center, wherein the file is associated with file metadata, and with an organization, the file metadata including one or more checksum values and information about the file, the file metadata including security-related metadata and transfer latency metadata,
    wherein the file transfer manager is configured to cause the at least one processor to:
        intercept, via an application programming interface (API), an operating system call issued at the source computing device, the intercepted operating system call including a file transfer request for transferring the file;
        determine whether or not the file already exists at the target computing device based on the one or more checksum values;
        compute network metadata about the network conditions of a private wide area network (WAN) and of a plurality of publicly available data hosting services in response to the determination that the file does not already exist at the target computing device, the network metadata including information representing available network bandwidth on the private WAN and available network bandwidth on the plurality of publicly available data hosting services, wherein the private WAN is a computer network administered by the organization, and each of the plurality of publicly available data hosting services is a network that is not administered by the organization; and
        programmatically select either the private WAN or one of the plurality of publicly available data hosting services for transferring the file by executing path decision logic, wherein the path decision logic includes decision criteria specifying weights applied to the security-related metadata and the transfer latency metadata, wherein the security-related metadata is associated with a higher weight than the transfer latency metadata,
    wherein, in response to the selection of one of the plurality of publicly available data hosting services for transferring the file, the file transfer manager is configured to cause the at least one processor to:
        upload the file to the selected publicly available data hosting service;
        transfer configuration data to the second data center, the configuration data including information for accessing the selected publicly available data hosting service, the configuration data including a digital certificate;
        instruct the second data center to download the file from the selected publicly available data hosting service using the configuration data; and
        instruct the second data center to transfer the file from the second data center to the target computing device.

2. The system of claim 1, wherein the file transfer manager is configured to cause the at least one processor to instruct the selected publicly available data hosting service to select one of a plurality of data centers of the selected publicly available data hosting service based on the plurality of data centers' proximity to the second data center, wherein the file is uploaded to the selected data center of the selected publicly available data hosting service.

3. The system of claim 1, wherein the file metadata includes a description of contents of the file, a size of the file, a usage or access history of the file, and an owner of the file.

4. The system of claim 1, wherein the file metadata includes specified security levels, quality of service levels, priority levels related to individual members or classes of member of the organization associated with the file, and at least one constraint on file transfers.

5. The system of claim 1, wherein the file transfer manager is configured to cause the at least one processor to update at least a portion of the file metadata.

6. The system of claim 1, wherein the configuration data includes credential information associated with the organization for use in accessing an account provided by the selected publicly available data hosting service.

7. A method comprising:
    transferring, by a file transfer manager implemented at a first data center, a file from a source computing device to a target computing device, the source computing device being communicatively coupled to the first data center, the target computing device being communicatively coupled to a second data center, wherein the file is associated with file metadata, and with an organization, the file metadata including one or more checksum values and information about the file, the file metadata including security-related metadata and transfer latency metadata, wherein the transferring includes:
        intercepting, via an application programming interface (API), an operating system call issued at the source computing device, the intercepted operating system call including a file transfer request for transferring the file;
        determining whether or not the file already exists at the target computing device based on the one or more checksum values;
        computing network metadata about the network conditions of a private wide area network (WAN) and of a plurality of publicly available data hosting services in response to the determination that the file does not already exist at the target computing device, the network metadata including information representing available network bandwidth on the private WAN and available network bandwidth on the plurality of publicly available data hosting services, wherein the private WAN is a computer network administered by the organization, and each of the plurality of publicly available data hosting services is a network that is not administered by the organization;

programmatically selecting the private WAN or one of the plurality of publicly available data hosting services for transferring the file by executing path decision logic, wherein the path decision logic includes decision criteria specifying weights applied to the security-related metadata and the transfer latency metadata, wherein the security-related metadata is associated with a higher weight than the transfer latency metadata; and wherein, in response to the selection of one of the plurality of publicly available data hosting services for transferring the file, the method further includes the file transfer manager for:

uploading the file to the selected publicly available data hosting service;

transferring configuration data to the second data center, the configuration data including a digital certificate, wherein the configuration data including information for accessing the selected publicly available data hosting service;

instructing the second data center to download the file from the selected publicly available data hosting service using the configuration data; and instructing the second data center to transfer the file from the second data center to the target computing device.

8. The method of claim 7, further comprising:
instructing the selected publicly available data hosting service to select one of a plurality of data centers of the selected publicly available data hosting service based on the plurality of data centers' proximity to the second data center, wherein the file is uploaded to the selected data center of the selected publicly available data hosting service.

9. A computer program product including instructions recorded on a non-transitory computer readable storage medium and configured to cause at least one processor to:
transfer, by a file transfer manager implemented at a first data center, a file from a source computing device to a target computing device, the source computing device being communicatively coupled to the first data center, the target computing device being communicatively coupled to a second data center, wherein the file is associated with file metadata, and with an organization, the file metadata including one or more checksum values and information about the file, the file metadata including security-related metadata and transfer latency metadata, wherein the instructions to transfer include:

intercept, via an application programming interface (API), an operating system call issued at the source computing device, the intercepted operating system call including a file transfer request for transferring the file;

determine whether or not the file already exists at the target computing device based on the one or more checksum values;

compute network metadata about network conditions of a private wide area network (WAN) and of a plurality of publicly available data hosting services in response to the determination that the file does not already exist at the target computing device, the network metadata including information representing available network bandwidth on the private WAN and available network bandwidth on the plurality of publicly available data hosting services, wherein the private WAN is a computer network administered by the organization, and each of the plurality of publicly available data hosting services is a network that is not administered by the organization;

programmatically select the private WAN or one of the plurality of publicly available data hosting services for transferring the file by executing path decision logic, wherein the path decision logic includes decision criteria specifying weights applied to the security-related metadata and the transfer latency metadata, wherein the security-related metadata is associated with a higher weight than the transfer latency metadata; and wherein, in response to the selection of one of the plurality of publicly available data hosting services for transferring the file, the file transfer manager further configured to:

upload the file to the selected publicly available data hosting service, transfer configuration data to the second data center, wherein the configuration data including information for accessing the selected publicly available data hosting service, instruct the second data center to download the file from the selected publicly available data hosting service using the configuration data, and instruct the second data center to transfer the file from the second data center to the target computing device, the configuration data including a digital certificate.

10. The computer program product of claim 9, wherein the private WAN includes geographically-distributed data centers.

11. The computer program product of claim 9, further comprising:
instruct the selected publicly available data hosting service to select one of a plurality of data centers of the selected publicly available data hosting service based on the plurality of data centers' proximity to the second data center, wherein the file is uploaded to the selected data center of the selected publicly available data hosting service.

* * * * *